United States Patent
Erb

(10) Patent No.: US 8,504,618 B2
(45) Date of Patent: Aug. 6, 2013

(54) DYNAMIC MAILBOX SIZE CONFIGURATION BY SELF MODIFICATION BASED ON HISTORICAL BEHAVIOR

(75) Inventor: Paul Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1758 days.

(21) Appl. No.: 11/483,893

(22) Filed: Jul. 10, 2006

(65) Prior Publication Data

US 2007/0073636 A1  Mar. 29, 2007

(30) Foreign Application Priority Data

Jul. 12, 2005 (EP) .................................. 05106378

(51) Int. Cl.
*G06F 15/16* (2006.01)
(52) U.S. Cl.
USPC ........................... 709/206; 709/207; 707/665
(58) Field of Classification Search
USPC .......................................................... 709/206
See application file for complete search history.

(56) References Cited

U.S. PATENT DOCUMENTS

| | | | | |
|---|---|---|---|---|
| 7,392,281 B1 * | 6/2008 | Kanojia et al. | ................ | 709/202 |
| 2002/0059380 A1 * | 5/2002 | Biliris et al. | ................ | 709/206 |
| 2003/0061395 A1 | 3/2003 | Kingsbury et al. | ........... | 709/312 |
| 2003/0140309 A1 * | 7/2003 | Saito et al. | ................... | 715/500 |

FOREIGN PATENT DOCUMENTS

| | | |
|---|---|---|
| EP | 0 701 205 A2 | 3/1996 |
| EP | 701205 A2 * | 3/1996 |
| EP | 0 802 477 A1 | 10/1997 |
| EP | 0 802 182 A2 | 1/1998 |
| EP | 820182 A2 * | 1/1998 |
| EP | 0 701 205 A3 | 12/1999 |
| EP | 0 961 203 A2 | 12/1999 |
| EP | 0 961 203 A3 | 12/2003 |

OTHER PUBLICATIONS

Buffer Management Issues in the Implementation of Fast Interprocess Communication Software Practice & Experience, Wile & Sons, Bognor Regis, GB, vol. 26, No. 2, Feb. 1, 1996, pp. 195-211, XP000618912 ISSN: 0038-0644.*
"The Registry, or, What Was So Bad About. INI Files?", *Inside the Windows 95*, 1986, pp. 1-34, 95, XP002253869.
Kougiouris, Panos et al., "Buffer Management Issues in the Implementation of Fast Interprocess Communication", *Software Practice & Experience*, Wile & Sons, Bognor Regis, GB, vol. 26, No. 2, Feb. 1, 1996, pp. 195-211, XP000618912 ISSN: 0038-0644.

* cited by examiner

*Primary Examiner* — Tauqir Hussain

(57) ABSTRACT

The present invention relates generally to call control system sub-processes for a telephone private branch exchange, and, more particularly, to the configuration of mailboxes for those sub-processes. A call control system comprising a plurality of processes, a mailbox for each of said processes, and wherein one of said processes, is responsive to a fullness measure of corresponding said mailbox, for altering the size of said corresponding mailbox during run time is provided.

14 Claims, 6 Drawing Sheets

… etc. Each mailbox is of fixed size during operation.
DYNAMIC MAILBOX SIZE CONFIGURATION BY SELF MODIFICATION BASED ON HISTORICAL BEHAVIOR

FIELD OF THE INVENTION

The present invention relates generally to management of sub-processes for software systems, and, more particularly, to the configuration of mailboxes for those sub-processes.

BACKGROUND OF THE INVENTION

Software systems are known in the art for managing or controlling system resources to achieve a desired result. For example, Call Control processes may be configured within a telephony system for establishing, maintaining and terminating calls. Common examples of such processes include dialing and transfer. According to the present state of the art, a call control system may be divided into a number of components. Those components may be put into effect by a number of processes. A few examples of call control processes are an Originating Call Process and a Terminating Call Process. These two processes implement a phone call according to the two half-call model.

In order for a set of processes to properly implement the call control system, there must be a method of coordination between the processes. One method of coordination is the implementation of a message subsystem and mailboxes (one per process) into which messages are delivered for subsequent processing. In the example of an Originating Call Process, a DTMF keystroke would result in a Key Press Message, delivered to that process.

Due to the non-deterministic nature of process scheduling it is common that a number of messages are queued in a mailbox before the associated process is scheduled. The extent of message queuing is increased when the associated process is delayed, runs at a lower priority, or receives many messages at a particular time. As a result messages may not be delivered because the mailbox for a process is full. Although the occurrence is typically logged (for possible later resolution), the message is lost and system behaviour may be impacted. Unilaterally increasing mailbox size would waste resources while merely increasing the threshold at which messages are lost.

What is needed is a resource conservative method or apparatus, that reduces or eliminates lost messages.

SUMMARY OF THE INVENTION

The present invention provides, in a software system composed of multiple processes communicating via mailboxes, for run time alteration of mailbox size. This, in turn, provides for the reduction of lost messages while conserving mailbox waste space.

Alternative embodiments also provide for historical tracking of the mailbox characteristics, optional activation of the dynamic sized mailboxes, and the implementation of stability algorithms, which reduces or eliminates oscillation of dynamic mailbox size.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
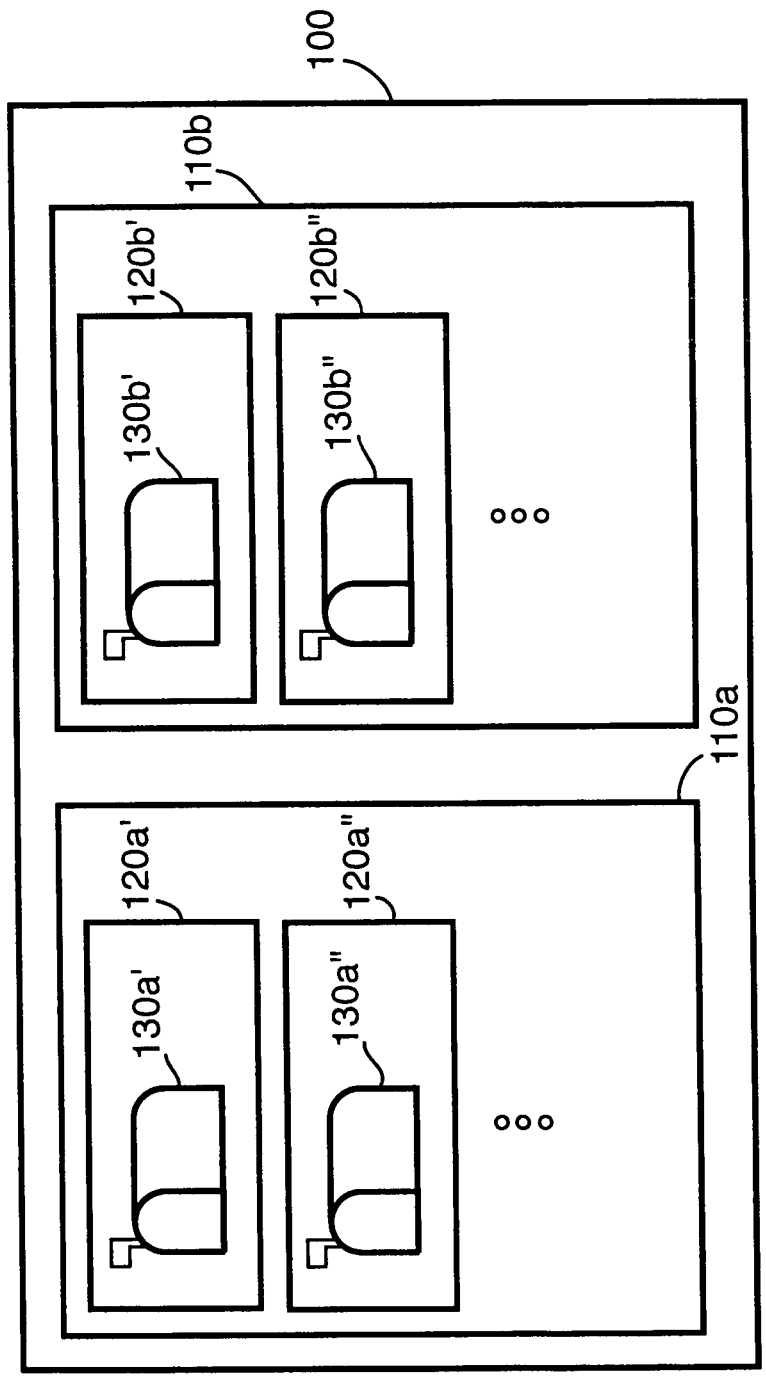
FIG. 1 is a representation of a prior art call control system.

Referring to FIG. 1, there is a block diagram of a call control system 100 according to the prior art. This particular call control system consists of a number of components: 110$a$, 110$b$, … etc. Each component is, in turn, implemented by one or more processes 120$a'$, 120$a''$, … 120$b'$, 120$b''$, … etc. Each process has a mailbox 130$a'$, 130$a''$, … 130$b'$, 130$b''$, … etc. Each mailbox is of fixed size during operation.

Currently, there are two methods to configure mailbox resources. In the first method, the number of messages is explicitly configured for each mailbox (or given a system default size) at implementation time. A designer chooses this number based on an understanding of how the process handles messages, however, this is an arbitrary choice and does not reflect the behaviour under unusual circumstances (i.e. heavy load conditions).

When logs are reported, it is not uncommon for a system administrator to review the cause and potentially increase the size of an associated mailbox. However, this requires a new system to be released that includes the changes for the field. It is not possible to change the mailbox size at a customer site without an associated upgrade (patch or full). Additionally, product support and design need to be involved in identifying and resolving the problem. Message loss may still recur as a result of other performance factors.

In the second method, a sufficiently large number of messages is configured for more critical mailboxes to handle more than would be expected (giving ample extra message space to allow for processing to catch up before an overflow occurs). Unfortunately, unless the number is periodically increased with each release, the mailbox size may become inadequate as new capabilities are added to the system. As well, this approach may needlessly allocate a large number of mailbox entries that increase system overhead.

Neither method is responsive to run time circumstances. The first method is complicated and labor intensive; the second method fails to conserve resources.

Figure 2:
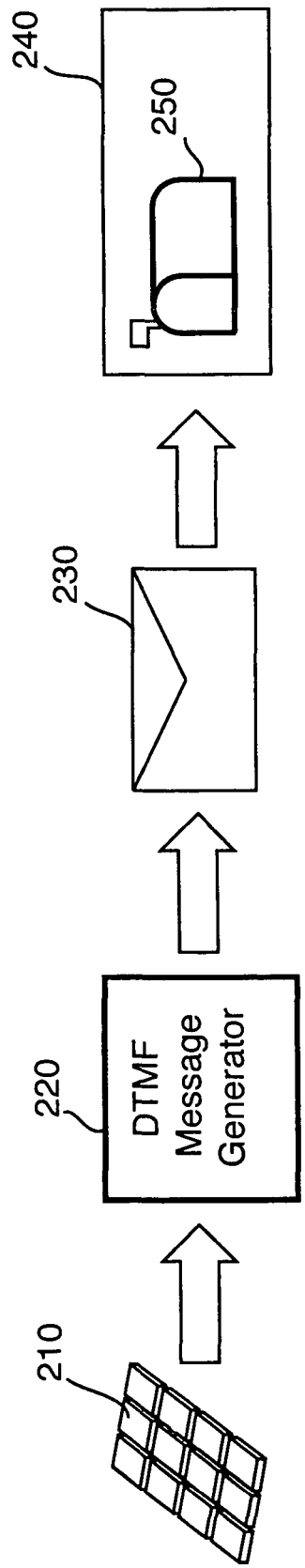
FIG. 2 is a representation of a prior art message event.
Figure 3:
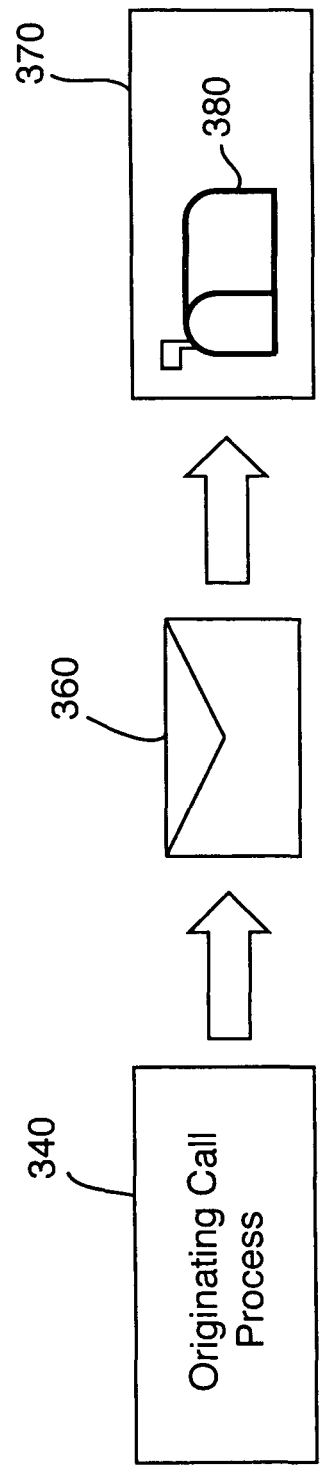
FIG. 3 is a representation of another prior art message event.

Referring to FIGS. 2 and 3, example message events are illustrated. In FIG. 2, a keypress of a DTMF keypad 210 results in a message 230 being generated by DTMF message generator 220. The message is delivered to the mailbox 250 of originating call process 240.

In FIG. 3 another example originating call process 340 delivers a message 360 to the mailbox 380 of terminating call process 370.

Figure 4:
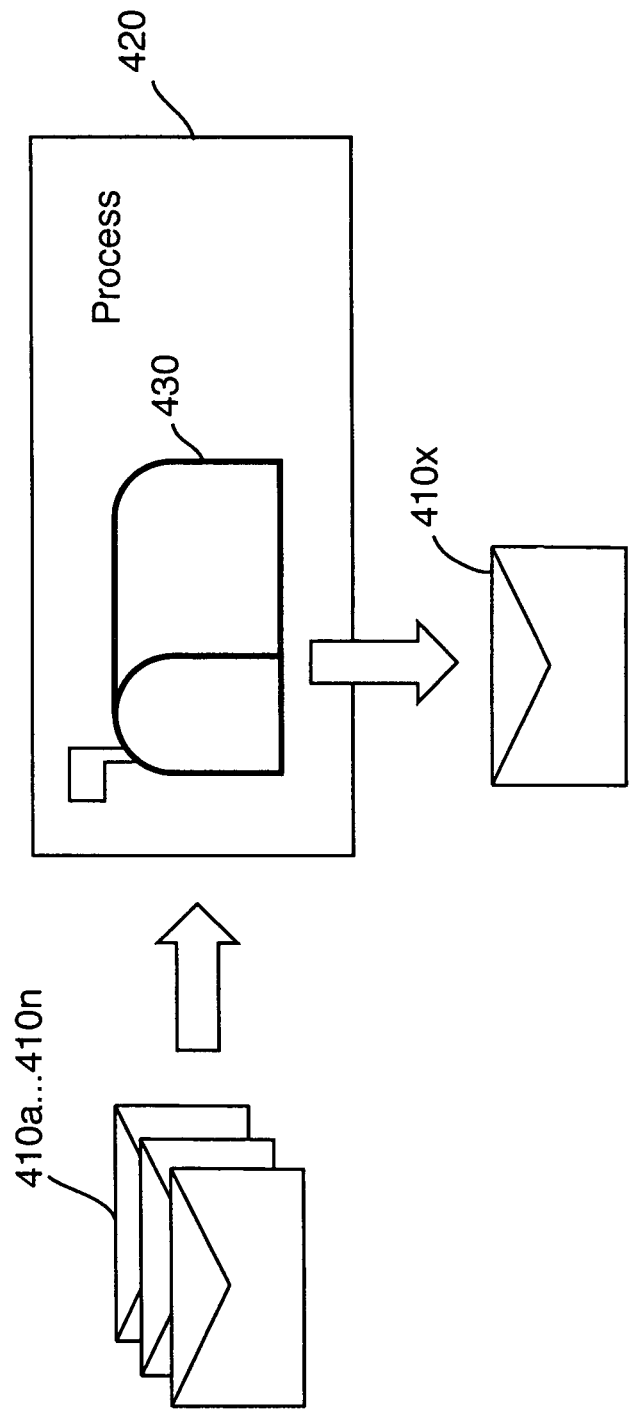
FIG. 4 is a representation of a prior art message event including a dropped message.

In FIG. 4, the aforementioned problem is illustrated by example. Process 420 is dedicated to forwarding call control status outside of the call control system. The mailbox 430 of process 420 receives messages 410$a$ … 410$n$ etc. relating to device state changes. Since mailbox 430 is fixed in size, a message 410$x$, arriving when mailbox 430 is full, must be dropped, as shown.

The prior art, as described in relation to FIGS. 1-4, does not provide for:

1) Dynamic allocation of mailbox size (for each mailbox where this is required);
2) Refinement of mailbox size over time, which improves resource utilization;
3) System recovery from inadequate mailbox size problems without a system upgrade (and without involvement of product support and design personnel).
4) Logs including an indication of when a mailbox size is changed for audit purposes and for verification of lost messages (or potentially under-utilization).

Figure 5:
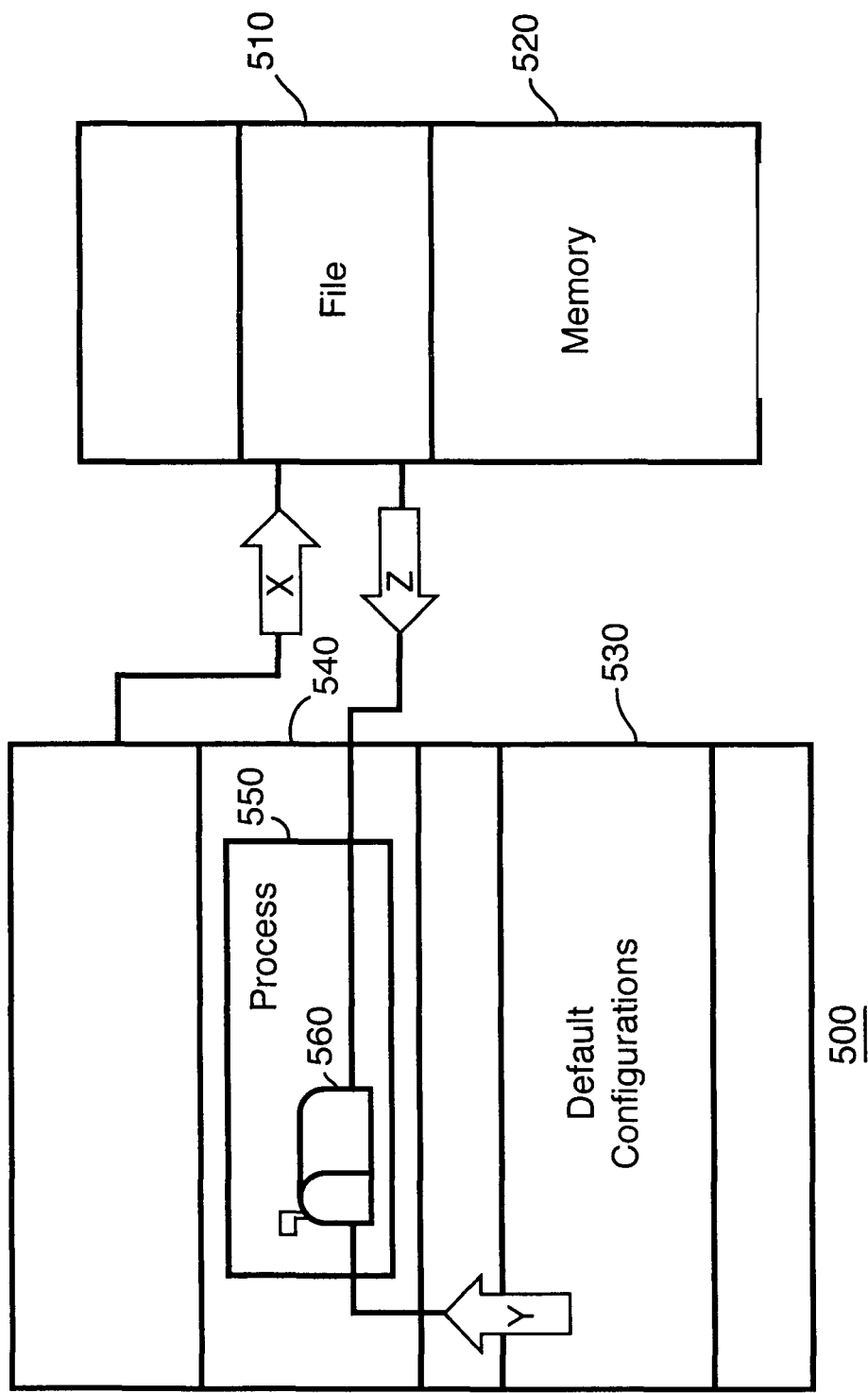
FIG. 5 is a representation of system initialization according to the present invention.

The present invention does provide for these features, as set forth herein below. According to one embodiment of the present invention and referring to FIGS. 5 (system) and 7 (process), on system initialization or when the system is reset, a call control system 500 attempts to read (Step X) a dynamic configuration file 510 stored in persistent memory 520 (with a well defined name and location, for example MailboxDymicInfo.cfg). If the file 510 is not present (or is unreadable) the default configurations 530 coded in software are used to set sizes of mailboxes 560 (Step Y), when spawning processes 550 of components 540. Mailboxes 560 are created using these default values and system 500 behaviour proceeds without any dynamic reconfiguration. Thus, the dynamic capabilities may be disabled by simply omitting or erasing the dynamic configuration file 510.

However, if the file 510 is present and readable the contents are parsed. The first line in the file indicates versioning and parameters to manage system wide behaviour i.e. across system 500. In particular, the first line includes an identifier of how many history events to include and the current position in history. The second line provides column headings in English language text to assist human readability of the file. The third line provides column heading delineations. Each successive line (from the fourth line until the end of file) identifies a specific mailbox 560 for management and an associated series of mailbox specific information (in columns on the same line as the mailbox name). Each line can be of any length and is terminated by a hard carriage return (<CR>). An example of file content is provided in table 1:

"MAX" with the threshold not set after the "MAX" condition occurs. Additionally, each time a message 610 is lost due to overflow of a managed mailbox 620, handling is invoked to update the history 640 as well as the usual logging of message loss. The "MAX" indication is replaced by a "Lxx" where xx is a count of the messages lost (up to 99).

The history 640 is maintained in a human readable form and can be modified as desired. The algorithm for determining whether the mailbox size 624 has increased/decreased and by what percentage/magnitude can also be selected from a number of choices (supported by the system implementation) based on an indication optionally included for each mailbox 620. Additional customizations and information may be controlled similarly.

The frequency of changing the size 624 can be limited to improve stability over time. A stabilizer number associated with a mailbox 620 is used by an algorithm to identify how many times a threshold 622 must be exceeded before an increase is applied (or similarly for under 50% to reduce the size 624). This stabilizer number may also be increased each time a change is applied to further dampen oscillations. The 95% threshold, MAX threshold and Lxx message indications are not controlled by this mechanism to ensure increased system load is accommodated without requiring system administrator intervention.

The initial configuration is still established at implementation time, by design. However, revised values may be provided with a released version or subsequently for specific site characteristics. For example, a retail customer may receive a tailored version to provide for initial mailbox configurations; this version may be different from a nominal ACD call center. No human intervention is required as the system adjusts its own configuration over time. Alternatively, the values in a system may be changed or overridden as desired. The invention may be applied to selected mailboxes of importance without impacting other mailboxes. While the invention has been described with specificity, simple variations will occur to those of skill in the art. For example, although the preferred embodiment has been described in terms of Call Control

TABLE 1

| MailboxConfigurator v1.0.0.1 HistorySize: 30 HistoryCurrent: 5 | | | | | | | | | | | | |
|---|---|---|---|---|---|---|---|---|---|---|---|---|
| Mailbox | Size | Last Change | Initial Size | Algorithm | Stabilizer | $1^{st}$ | $2^{nd}$ | $3^{rd}$ | $4^{th}$ | $5^{th}$ | $6^{th}$ | ... |
| q2000damp | 64 | −25% | 192 | Geometric |  | 75% | L02 | 95% | 50% | 10% | | |
| wakeup | 100 | None | 400 | Simple |  | 95% | 80% | None | 50% | 10% | | |
| cpprog | 6 | −1 | 30 | Slowed | 3 | 50% | 50% | 10% | 10% | 10% | | |

The system 500 uses the information for a mailbox 560 (including initial value, last value, and history) to determine the mailbox configuration for use when the mailbox 560 is created (Step Z). The history for a mailbox is updated, using the current position in history, to provide an indication of whether the value is increased or decreased (and by how much) as well as an initial threshold level of "Nil" or "None". System 500 also sets an initial threshold level on the mailbox 560 based on 10% of the mailbox size.

Figure 6:
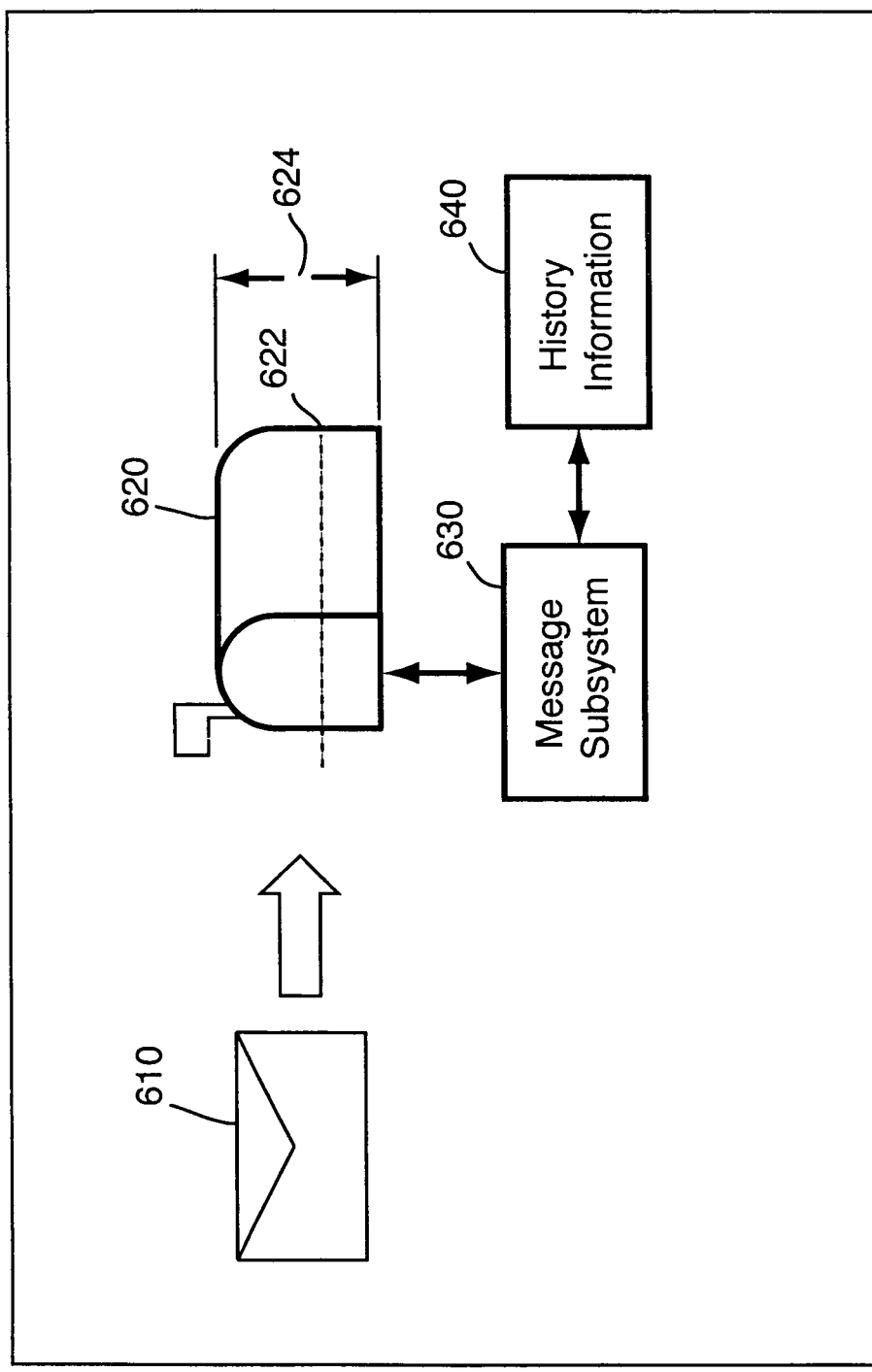
FIG. 6 is a representation of system operation according to the present invention.
Figure 7:
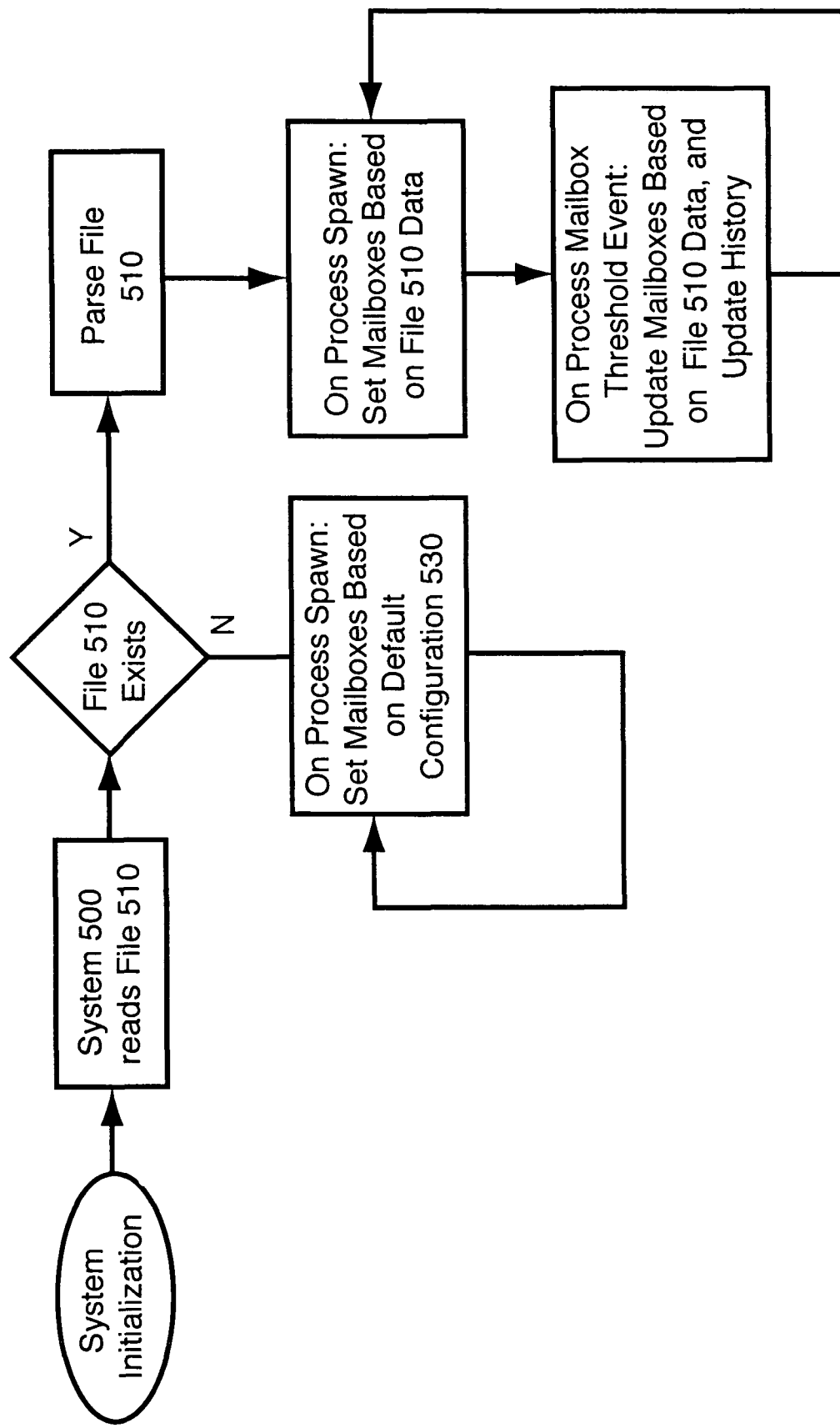
FIG. 7 is a flowchart showing steps for carrying out the present invention.

Referring to FIG. 6, during operation of system 500, as a message 610 is delivered to a mailbox 620 under management, the message subsystem 630 determines whether the number of messages queued exceeds a fullness measure (e.g. the current threshold setting 622) for the mailbox 620. When this occurs, handling is triggered to change both the history information 640 and the threshold setting 622 for the mailbox 620. The replacement progression is 10%, 50%, 80%, 95%, processes within a telephony system, a person of skill in the art will appreciate that the principles of the invention may be applied to the management of other allocated system resources (e.g. SMDR info records), and in other software systems.

The above-described embodiment of the invention is intended to be an example of the present invention and alterations and modifications may be effected thereto, by those of skill in the art, without departing from the scope of the invention which is defined solely by the claims appended hereto.

What is claimed is:
1. A software control system comprising:
a plurality of processes processed by one or more processors, each having an associated mailbox of predetermined size into which messages are delivered for subsequent processing;

a persistent memory for storing a file to be accessed when said system is initially powered and when said system is reset, said file comprising a characteristic of said mailbox including at least an initial size and a current size of said mailbox, last change, growth algorithm and history, said system uses said characteristic to configure said associated mailbox; and a message subsystem for altering the size of said mailbox during run time responsive to a fullness measure thereof, said fullness measure is a threshold number of messages for said associated mailbox, and for updating said file in said persistent memory to reflect said altered size of said mailbox;

wherein said history and threshold indicate if a message has been lost on overflow and said system updates said history according to current activity and said history and said threshold are updated when the messages in said associated mailbox exceed the threshold, and wherein at subsequent system reset, said mailbox will be configured according to said updated file.

2. The software control system according to claim 1 wherein at least one of said processes receives device state change messages via said associated mailbox.

3. The software control system according to claim 1 wherein said characteristics include a stabilizer for increasing stability of the threshold, and decreasing oscillation.

4. The software control system according to claim 3 wherein said stabilizer is varied after a change of said threshold.

5. The software control system of claim 1 comprising a telephony system.

6. The software control system of claim 5 wherein said plurality of processes comprises call control processes.

7. A method of managing mailboxes in a software control system comprising the steps of:

(a) providing a plurality of processes processed by one or more processors, each having an associated mailbox of predetermined size into which messages are delivered for subsequent processing;

(b) retrieving a file from persistent memory when said system is initially powered and when said system is reset, said file comprising a characteristic of said mailbox including at least an initial size and a current size of said mailbox, last change, growth algorithm and history, said system uses said characteristic to configure said associated mailbox;

(c) altering the size of said mailbox during run time responsive to a fullness measure thereof, said fullness measure is a threshold number of messages for said associated mailbox, said history and threshold indicate if a message has been lost on overflow and said system updates said history according to current activity and said history and said threshold are updated when the messages in said associated mailbox exceed the threshold;

(d) updating said file in said persistent memory to reflect said altered size of said mailbox; and (e) repeating steps (b) through (e), wherein at subsequent system reset said mailbox will be configured according to said updated file.

8. The method according to claim 7 further comprising receiving device state change messages via said associated mailbox.

9. The method according to claim 7 further comprising the steps:

configuring said system according to default values in the event said file is absent, and suspending any alteration according to step (c) until such time as the system is subsequently reconfigured.

10. The method according to claim 7 wherein said providing of said plurality of processes according to step (a) is made according to said characteristics of said mailbox.

11. The method according to claim 7 wherein said characteristics include a stabilizer for increasing the stability of the threshold, and decreasing oscillation.

12. The method according to claim 11 further comprising varying said stabilizer after a change of said threshold.

13. The method according to claim 11 wherein selection of the highest threshold changes is made irrespective of said stabilizer.

14. The method of claim 7 comprising a telephony software control system and said providing step comprises providing a plurality of call control processes.

* * * * *